Sept. 22, 1953  J. B. SCHILLING ET AL  2,653,218
BARREL, REFLECTOR BASE, AND ASSOCIATED
PARTS FOR ELECTRIC LANTERNS
Filed April 1, 1950  2 Sheets-Sheet 1
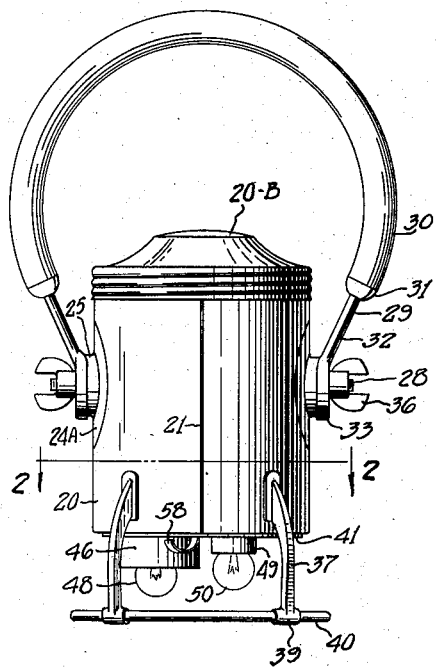
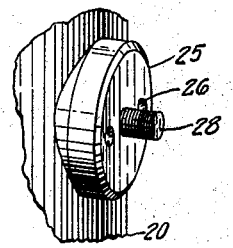
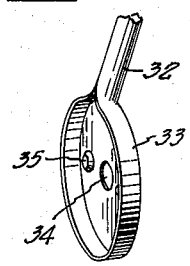
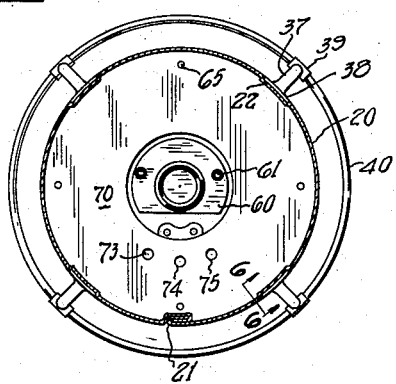
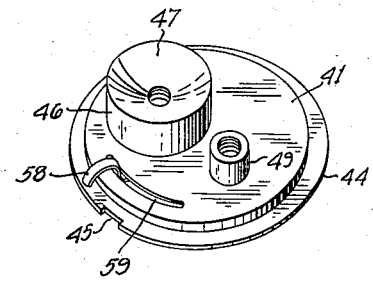
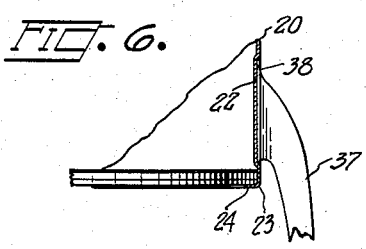
INVENTORS
JOHN B. SCHILLING
FORREST F. JONES
BY
ATTORNEY Sept. 22, 1953     J. B. SCHILLING ET AL     2,653,218
BARREL, REFLECTOR BASE, AND ASSOCIATED
PARTS FOR ELECTRIC LANTERNS
Filed April 1, 1950     2 Sheets-Sheet 2
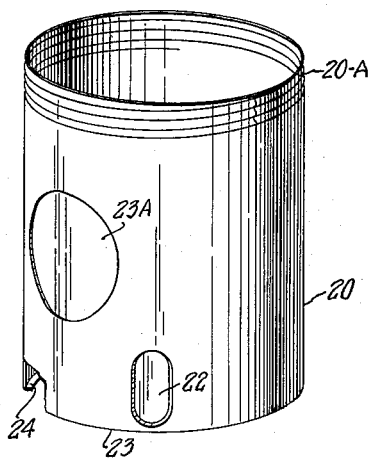
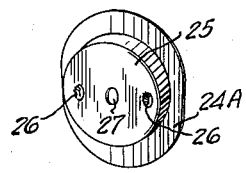
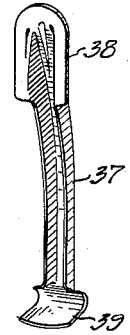
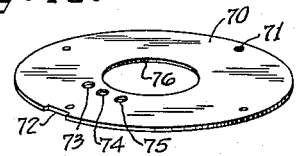
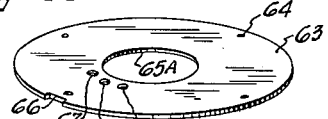
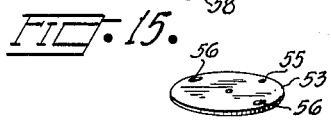
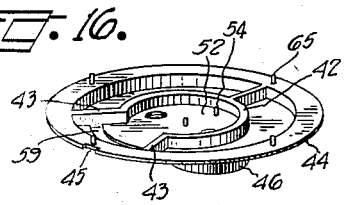
INVENTORS
JOHN B. SCHILLING
FORREST F. JONES
BY
ATTORNEY Patented Sept. 22, 1953

2,653,218

UNITED STATES PATENT OFFICE 2,653,218

BARREL, REFLECTOR BASE, AND ASSOCIATED PARTS FOR ELECTRIC LANTERNS

John B. Schilling and Forrest F. Jones, Portland, Oreg.

Application April 1, 1950, Serial No. 153,382

1 Claim. (Cl. 240—10.63)

This invention relates generally to electric lanterns and particularly to an electric railroad lantern.

The main object of this invention is to produce a light weight and extremely rugged lantern especially adapted for railroad use.

The second object is to make the entire switch assembly and other major parts replaceable, thereby enabling the user to repair his own lantern in a few seconds without the use of tools or expert skill, thereby saving time and money ordinarily lost when a lantern becomes inoperative.

The third object is to cast all stationary switch and reflector parts integrally and to hold other parts by means of rivets cast on the reflector.

The fourth object is to eliminate all springs therefrom.

The fifth object is to provide an extra strong leg construction, as this is a weak point in most lanterns.

The sixth object is to utilize the leg recesses for the purpose of indexing the leg positions and for locking the reflector and switch assembly in position.

The seventh object is to provide a convenient and reliable means of preventing the rotation of the switch unit by means of the container seam.

The eighth object is to so design the barrel to allow impacts to the guard to be dissipated throughout the entire lantern instead of at the point of leg fastening.

The ninth object is to provide swivels with large area in order to obtain the necessary amount of friction and in which the weight of the lantern is carried on the swivel instead of the screw.

We accomplish these and other objects as set forth in the following specification as illustrated by the accompanying drawings, in which:

Fig. 1 is a side elevation of the lantern.

Fig. 2 is a section taken along the line 2—2 in Fig. 1.

Fig. 3 is a fragmentary view showing the swivel boss.

Fig. 4 is a perspective view of a swivel and bail end.

Fig. 5 is a perspective view of the reflector and base.

Fig. 6 is a fragmentary section through the barrel showing the leg fastening and the manner of holding down the switch assembly.

Fig. 7 is a perspective view of the barrel.

Fig. 8 is a fragmentary section through the switch unit and the lower end of the barrel.

Fig. 9 is a perspective view of the swivel boss blank.

Fig. 10 is a perspective view of a leg blank.

Fig. 11 is a perspective view of the base ring.

Fig. 12 is a perspective view of the top metal switch plate.

Fig. 13 is a perspective view of the insulating switch plate.

Fig. 14 is a perspective view of the switch rotor disc and operating lever.

Fig. 15 is a perspective view of an insulating disc.

Fig. 16 is a perspective view of the reflector base and switch support.

Like numbers of reference refer to the same or similar parts throughout the several views.

Referring in detail to the drawings, there is shown a barrel 20 having a side seam 21 and having four depressions 22 formed around the lower edge 23 which has an inturned flange 24. The upper end of the barrel 20 is provided with threads 20–A for the cap 20–B. The barrel 20 is also provided with a pair of opposite oval depressions 23–A for the flange 24–A of the swivel boss 25. Each boss 25 is provided with a pair of depressions 26 in the flat side thereof, and a central hole 27 for the stud bolt 28. The flange 24–A is spot welded to the metal in the depression 23–A.

The handle or bail is formed of a wire loop 29, whose rounded portion is covered with a rubber tube 30, the ends of which are reenforced by the guards 31.

The ends 32 are provided with swivel ends 33 having the central bolt hole 34 and the inturned points 35 which register with the depressions 26. Wing nuts 36 are provided for the bolts 28.

Channel shaped legs 37 have flanges 38 formed at their upper ends which are spot welded in the depressions 22. The feet 39 are curled around the base ring 40 and secured thereto, making a very rigid and strong construction.

Below the flange 24 is a reflector base 41 having a partial annular flange 42 on its top side whose ends are joined by the radial spokes 43 to the flange rim 44 which rests on the top of the flange 24. The flange 44 has a notch 45 which receives the seam 21.

On the under side of the base 41 is a boss 46 within which is formed a reflector 47 in which is mounted an electric lamp bulb 48, the rays of which are converged to form a beam by the reflector 47.

A smaller boss 49 forms a socket for a second lamp 50 which affords general illumination.

The central electrode 51 of the lamps 48 and 50 extend to the bottom 52 of the enclosure formed by the flange 42 and spokes 43.

Resting on the surface 52 is a disk 53 of insulating material which is held against rotation by means of the pins 54 which are cast in the bottom 52 and occupy holes 55 in the disc 53. The disk 53 has mounted therein the two metal eyelets 56 which engage the electrodes 51.

Above the disk 53 and spaced therefrom is the rotor disk 57 of insulating material, to which is attached the switch lever 58 which projects through the arcuate slot 59 in the bottom 52 of the base 41.

To the disc 57 is also secured a metal contact plate 60 by means of the rivets 61. The side 62 of the contact plate 60 is cut away to clear the riveted end of the lever 58. The rivets 61 are placed on the same radius as are the eyelets 56.

The lever 58 has a raised point 59-A formed on its top side which serves to position the lever 58 in one of three positions, namely, general illumination, off or beam.

Equal in diameter to the rim 44 and contacting its top side is an insulating switch plate disk 63 provided with holes 64 for the pins 65 which are cast into the rim 44. The disk 63 has a large central opening 65-A which is almost as large in diameter as is the disk 53. The disk 63 also has a seam engaging notch 66 and three holes 67, 68 and 69 which can engage the point 59-A.

Equaling the disk 63 in diameter and shape is the top metal switch disk 70 having the pin holes 71, the seam notch 72, the indexing holes 73, 74 and 75 and central hole 76. The disks 63 and 70 are held down upon the rim 44 by the rivets 65.

Within the barrel 20 is a dry cell 77 from whose end 78 projects the central helical contact spring 79 and the flat contact spring 80 which engages the plate 70, while the spring 79 engages the contact plate 60.

It can be seen that depending upon which way the lever 58 is turned, the current will flow to one or the other or neither of the lamps 49 and 50.

Replacement of parts involves merely the removal of the cap 20-B and battery 77 and then by pressure of the fingers against the base 41, force it past the projections formed by the depressions 22.

We claim:

An electric lantern comprised of an upright cylindrical barrel having an inturned flange at its lower end and having a plurality of leg receiving depressions formed in the outer surface of the lower end thereof spaced from said flange, channel-shaped legs having flanges at their upper ends secured in said depressions, a wire base ring contacting the lower ends of said legs, each of said legs having a foot formed thereon wrapped around said ring, a combined reflector and switch, circular in form, free to slide within said barrel and capable of moving into position between said flange and depressions by the distortion of said barrel, said barrel having a pair of opposite depressions formed in the outer side thereof at approximately the middle of the length of the barrel, a pair of swivel bosses, each having a flange adapted to occupy one of said last mentioned depressions and secured therein, an arcuate rubber covered wire handle having flared circular ends journaling on said swivel bosses, said bosses and handle ends having registering depressions and points formed on their adjacent sides for releasably holding said handle in an upright position, and a screw cap for the upper end of said barrel.

JOHN B. SCHILLING.
FORREST F. JONES.

References Cited in the file of this patent

UNITED STATES PATENTS

| Number | Name | Date |
|---|---|---|
| 777,638 | Kelley | Dec. 13, 1904 |
| 910,708 | Mosher | Jan. 26, 1909 |
| 1,444,267 | Pearson | Feb. 6, 1923 |
| 1,579,832 | Patche | Apr. 6, 1926 |
| 1,598,930 | Patche | Sept. 7, 1926 |
| 1,893,292 | Larson | Jan. 3, 1933 |
| 1,893,294 | Larson | Jan. 3, 1933 |
| 1,927,713 | Merchant | Sept. 19, 1933 |
| 2,324,715 | Moxley | July 20, 1943 |
| 2,369,637 | Baird | Feb. 20, 1945 |